United States Patent [19]
Kraus

[11] Patent Number: 4,518,297
[45] Date of Patent: May 21, 1985

[54] MOLDED PLASTIC SOCKET WITH EASY-ON HARD-OFF STUD ENGAGER

[75] Inventor: Willibald Kraus, Kaiserslautern, Fed. Rep. of Germany

[73] Assignee: TRW Inc., Cleveland, Ohio

[21] Appl. No.: 437,226

[22] Filed: Oct. 28, 1982

[30] Foreign Application Priority Data

Nov. 4, 1981 [DE] Fed. Rep. of Germany ....... 3143775

[51] Int. Cl.³ .......................... F16B 29/00; F16L 3/08
[52] U.S. Cl. ..................................... 411/437; 411/512; 411/908; 403/361; 248/74.3; 24/16 PB
[58] Field of Search ....................... 248/71, 74.3, 74.5, 248/216.1; 24/16 PB, 150 FP, 457, 681, 662, 683, 665, 664, 685, 30.5 P, 16 R; 411/281, , 427, 429, 431, 437, 436, 432, 433, 360, 361, 512, 516, 517, 519; 403/361, 383; 16/121, 122

[56] References Cited

U.S. PATENT DOCUMENTS

| | | | |
|---|---|---|---|
| 2,926,409 | 3/1960 | Perry | 411/512 |
| 3,545,708 | 12/1970 | Gross | 411/437 |
| 3,701,373 | 10/1972 | Wronke et al. | 411/182 |
| 4,000,539 | 1/1977 | Neyer | 16/121 |
| 4,175,605 | 11/1979 | Johnson | 411/436 |
| 4,179,771 | 12/1979 | Rankins et al. | 16/121 |
| 4,235,404 | 11/1980 | Kraus | 248/74.5 |
| 4,261,539 | 4/1981 | Albern et al. | 248/74.5 |

FOREIGN PATENT DOCUMENTS 489928 6/1970 Switzerland ..................... 248/74.5

Primary Examiner—Thomas J. Holko
Assistant Examiner—Neill Wilson
Attorney, Agent, or Firm—Daniel G. Blackhurst

[57] ABSTRACT

The invention relates to a plastics fastening device for attachment on a threaded bolt. The device comprises a mounting section having a cylindrical aperture in which is disposed a thin-walled cylindrical sleeve connected to an interior wall of the aperture by a plurality of radially extending ribs. The mounting of the device on a bolt is facilitated by the provision of a plurality of longitudinally extending grooves on an inner surface of said cylindrical sleeve.

11 Claims, 6 Drawing Figures

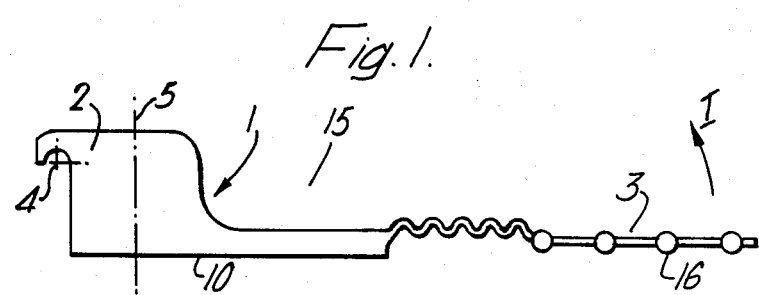
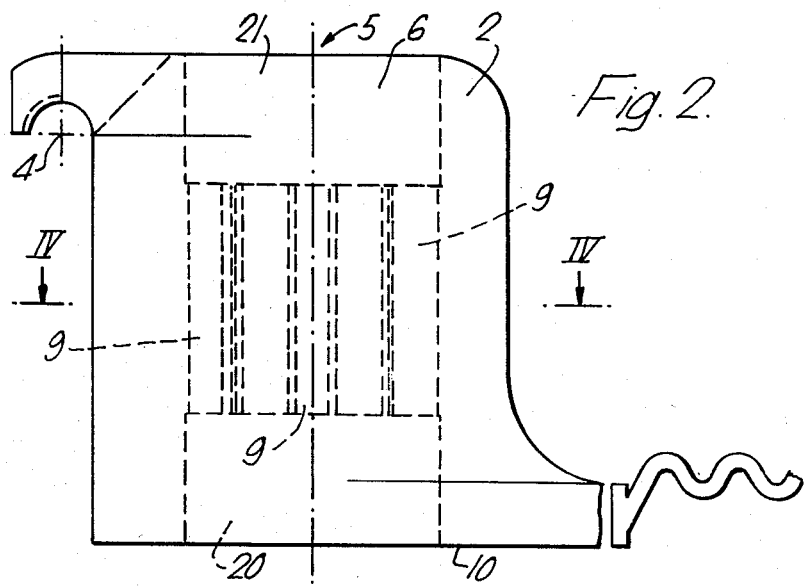
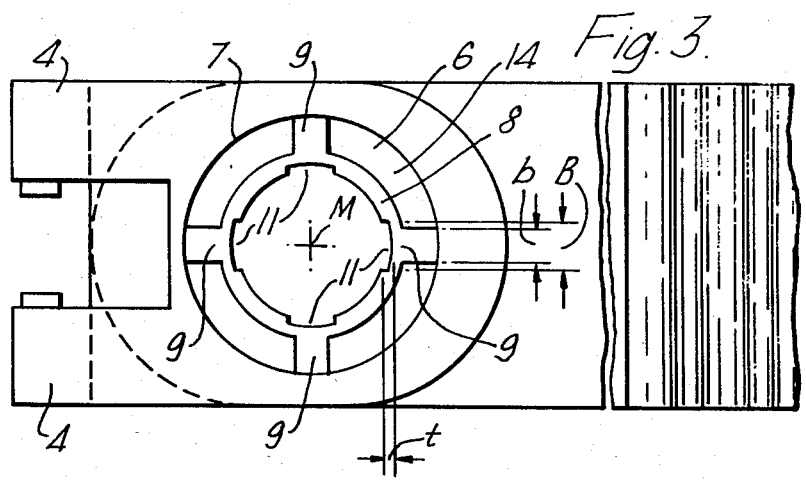

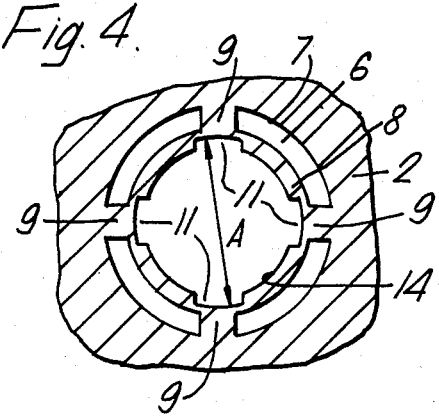
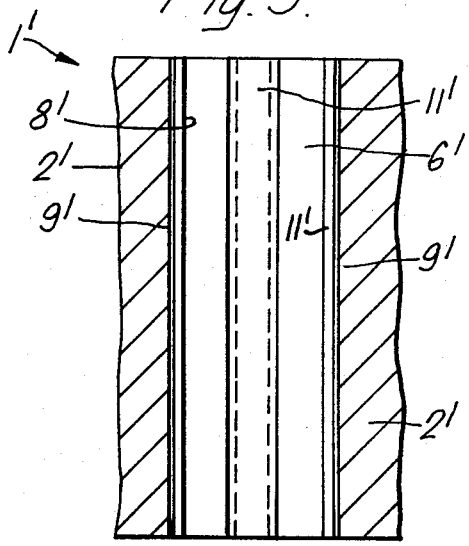
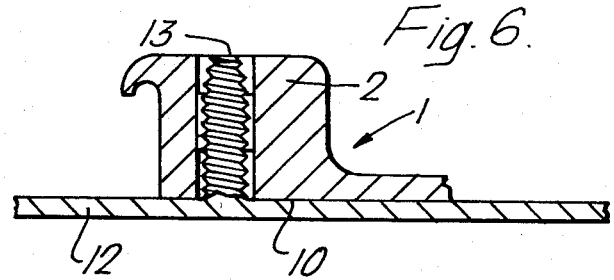

MOLDED PLASTIC SOCKET WITH EASY-ON HARD-OFF STUD ENGAGER

FIELD OF INVENTION

The present invention relates to a fastening device comprising a retaining element and a cylindrical aperture enabling the device to be mounted on a threaded bolt. More particularly it is concerned with a device of this type in which the cylindrical aperture houses a thin-walled cylindrical sleeve which is connected to the wall of the aperture by a plurality of radial ribs.

DESCRIPTION OF PRIOR ART

It is known to employ this type of fastening device to fasten cables or pipes to the underside of a motor vehicle. The device is mounted on a threaded bolt attached to a support, for example, the underside of a motor vehicle and the retaining device has a thin-walled cylindrical sleeve located within the aperture, but spaced from the aperture wall. When the device is mounted on the bolt, the thread of the bolt is embedded in the thin-walled cylindrical sleeve and thus the retaining device is properly mounted on the support by the interengagement of the threaded bolt and the thin-walled cylindrical sleeve.

However, the disadvantage of this known type of device is that considerable forces are required to apply the retaining device to the threaded bolt. Further, these mounting forces can often be applied only with great difficulty, for instance if the retaining device has to be mounted on a bolt which is not easily accessible. Additionally, the interengagement of the thread of the bolt in the thin-walled cylindrical sleeve, which is made of plastic material, is often insufficient over a prolonged period and there is a danger of the retaining device becoming detached from the support.

OBJECTS OF THE INVENTION

It is an object of the present invention to provide a device of this type which, on the one hand, requires a relatively small force to mount it on a bolt, but, on the other hand, a substantial removal force to detach it from the bolt.

SUMMARY OF THE INVENTION

This object is achieved in accordance with the invention by providing a plastics fastening device for attachment on a threaded bolt, the device having a cylindrical aperture, a thin-walled cylindrical sleeve radially spaced from and connected to the wall of the aperture by a plurality of radial ribs, characterized in that the inner surface of the cylindrical sleeve is formed with a plurality of grooves extending in the direction of the longitudinal axis of the sleeve.

In a particular embodiment of the invention, each groove is arranged adjacent to and extends in parallel with a rib. The width of each groove may be greater than the width of each rib. The depth of each of the grooves may be less than its width.

In a particular embodiment of the invention, the grooves are arranged diametrically opposite one another and the distance between the bottom faces of the or each diametrically opposite pair of grooves is arranged to be equal to the crest diameter of the bolt on which the device is to be mounted. This feature has the advantage that the inner wall of the cylindrical sleeve is divided into sections as a result of which only relatively small forces have to be applied during mounting whereas considerable forces need to be applied during removal.

The aperture, the thin-walled cylindrical sleeve, the ribs and the grooves may extend through the entire device. Alternatively, the aperture may extend through the entire device and the thin-walled cylindrical sleeve, the ribs and the grooves may extend through only one part of the aperture. Optionally, the said part may lie approximately in the longitudinal center of the cylindrical aperture.

In a particular embodiment of the invention, the aperture, the thin-walled cylindrical sleeve, the ribs and the grooves extend through only a part of the device. Optionally, the thin-walled cylindrical sleeve, the ribs and the grooves may be shorter in the longitudinal direction than the length of the aperture.

BRIEF DESCRIPTION OF THE DRAWINGS

The invention will now be described in more detail below with the aid of the accompanying drawing, in which:

FIG. 1 is a diagrammatic side view of a fastening device made of plastics material;

FIG. 2 is an enlarged side view of the mounting section of the fastening device;

FIG. 3 is a plan view of the mounting section of the fastening device as shown in FIG. 2;

FIG. 4 is a section taken on line IV—IV in FIG. 2;

FIG. 5 is a section through the mounting section of an alternative embodiment of the invention; and FIG. 6 is a diagrammatic view of the mounting section of the fastening device of FIGS. 1 through 4 mounted on a threaded bolt.

DETAILED DESCRIPTION OF SPECIFIC EMBODIMENTS

In FIG. 1 a fastening device in the form of a cable tie is shown in side view. The device 1 comprises a mounting section 2 and a cable retaining section 3 adapted to engage with retaining claws or jaws on the mounting section. The fastening device 1 is adapted to be mounted on a support with its underside 10 against the surface of the support, as shown in FIG. 6.

As can be seen from FIG. 6, a support 12 is provided with a threaded bolt 13 and the mounting section 2 of the device 1 is connected to the threaded bolt 13 with the underside 10 of the mounting section 2 lying on the upper surface of the support 12.

When the device 1 has been mounted on a support 12, the cable retaining section 3 is moved upwardly in the direction of arrow I until it encircles a cable or cables (not shown) lying in the area 15. Webs 16 of the cable retaining section on strap 3 are then engaged with the retaining claws 4 to fasten the cables on the fastening device 1 and therefore on the support 12. To secure the device 1 on the support 12, the mounting section 2 is formed with a cylindrical aperture 6, which is shown in detail in FIGS. 2 and 3. In the present embodiment this cylindrical aperture 6 has, as shown in FIG. 3, four ribs 9 arranged in diametrically opposite pairs which attach a thin-walled cylindrical sleeve 8 to the surface of wall 7 of the aperture 6 so that the sleeve 8 is spaced from but connected to the wall 7. This thin-walled cylindrical sleeve 8 is arranged so as to be concentric with the center M of the cylindrical aperture 6.

Grooves 11 extending in the direction of the longitudinal axis L of the aperture 6 and sleeve are provided on the inner surface 14 of the cylindrical ring 8. These grooves 11 are formed adjacent the ribs 9 as shown in FIG. 3. The width B of each groove 11 is greater than the width b of each rib 9 and the depth t of each of the grooves 11 is less than the width B of each groove.

As shown in FIG. 4, the distance between the bottom faces of the diametrically opposite grooves 11 is approximately equal to the crest diameter of the thread on the bolt 13, or is approximately equal to the radial dimension of the thread crest of the bolt. Consequently, when the retaining element is in place on the bolt 13, the plastics material of the sleeve 8 flows or resiles into the thread of the bolt. This gives the advantage that, while a relatively small force is required to push the device onto the bolt, once the material of the sleeve 8 is embedded in the thread, a substantially greater force is required to overcome the grip of the material of the sleeve 8 on the thread and start removal of the device from the bolt. For example, the force necessary to apply the retaining element can be as little as 10 to 15 kg and the removal force as high as 70 to 80 kg. The removal force required can be determined to close tolerances by varying the width and depth of the grooves 11 and the force necessary to apply the retaining device to the bolt can be facilitated either by forming the bolt with a tapered end or the sleeve 8 with a flared entry position.

In the embodiment of FIGS. 2, 3 and 4, the aperture 6 extends through the entire device 1. The thin-walled cylindrical ring 8, the ribs 9 and the grooves 11 occupy only a part of the aperture 6, and, in the embodiment shown in FIG. 2, they lie in the longitudinal center of the cylindrical aperture 6. Consequently, there are areas 20 and 21 of the cylindrical aperture 6 which do not surround the thin-walled cylindrical ring 8, ribs 9 or grooves 11.

In an alternative embodiment shown in FIG. 5 in which the primed reference numerals correspond to like numerals used in FIGS. 1 through 4, a fastening device 1' comprises a mounting section 2' comprising an aperture 6' extending therethrough and a thin-walled cylindrical ring 8', ribs 9' and grooves 11' which extend the entire length of the aperture 6'.

In the embodiments described, the fastening device 1 or 1' is provided with four ribs 9 or 9' and four grooves 11 or 11'. It is also possible to provide a smaller or larger number of grooves and ribs in the cylindrical aperture 6. Additionally the grooves 11 may be arranged differently on the inner circumference 14 of the thin-walled cylindrical ring 8 and may not each be adjacent to one of the ribs 9. In all cases, the inner circumference 14 of the thin-walled cylindrical sleeve 8 is divided up by grooves 11 or 11' whereby relatively low forces for mounting are required with relatively high forces being required to effect removal as a result of improved seating of the bolt 13.

Any of the described embodiments may be modified so that the cylindrical aperture, the thin-walled cylindrical sleeve, the ribs and the grooves extend through only a portion of the fastening device 1. Furthermore, the thin-walled cylindrical sleeve, the ribs and the grooves may be shorter in the longitudinal direction than the length of the aperture.

I claim:
1. A plastic fastening device for attachment on a threaded bolt comprising:
   a mounting section, a wall on the mounting section, and a cylindrical aperture defined by said wall;
   a thin-walled cylindrical sleeve having an inner surface and an outer surface, said sleeve axially disposed within and radially spaced from said aperture;
   a plurality of radially extending ribs connecting said sleeve to said wall,
   a plurality of grooves formed in said inner surface and extending in the direction of the longitudinal axis of said sleeve said grooves generally overlying said ribs and extending parallel thereto.

2. A device according to claim 1 wherein the width of each of said grooves is greater than the width of each of said ribs.

3. A device according to claim 2 wherein the depth of each of said grooves is less than the width thereof.

4. A device according to claim 1 wherein said aperture, said thin-walled cylindrical sleeve, said ribs and said grooves extend through said device.

5. A device according to claim 1 wherein said aperture extends through said device and said thin-walled cylindrical sleeve, said ribs and said grooves extend through a part of the length of said aperture.

6. A device according to claim 5 wherein said part of the length of said aperture lies approximately in the longitudinal center of said aperture.

7. A device according to claim 1 wherein said aperture, said thin-walled cylindrical sleeve, said ribs and said grooves extend through only a part of said device.

8. A device according to claim 7 wherein said thin-walled cylindrical sleeve, said ribs and said grooves are shorter in the longitudinal direction than the length of said aperture.

9. A device according to claim 1 comprising four ribs and four grooves.

10. A device according to claim 1 wherein the grooves are diametrically opposed and the distance between the bottom faces of the diametrically opposed pairs of said grooves is equal to he crest diameter of said bolt on which said device is to be mounted.

11. A plastic fastening device for attachment on a threaded bolt comprising:
   a mounting section, a wall on the mounting section, and a cylindrical aperture defined by said wall;
   a thin-walled cylindrical sleeve, an inner surface and an outer surface on said sleeve, said sleeve disposed in and radially spaced from said aperture;
   a plurality of radially extending ribs, said ribs connecting said sleeve to said wall;
   a plurality of grooves, said grooves being formed in said inner surface and extending in the direction of the longitudinal axis of said sleeve,
   each of said grooves being arranged adjacent to and extending in parallel, overlying relation with one of said ribs, and wherein said grooves are disposed on the inside surface of said sleeve and the radial distance between the bottom face of each groove and the longitudinal center of the aperture is equal to the radial crest dimension of said bolt on which said device is to be mounted.

* * * * *